(12) United States Patent
Paul (10) Patent No.: US 7,965,397 B2
(45) Date of Patent: Jun. 21, 2011

(54) SYSTEMS AND METHODS TO MEASURE BANDING PRINT DEFECTS

(75) Inventor: Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1246 days.

(21) Appl. No.: 11/399,100

(22) Filed: Apr. 6, 2006

(65) Prior Publication Data

US 2007/0236747 A1    Oct. 11, 2007

(51) Int. Cl.
*G06F 3/12* (2006.01)

(52) U.S. Cl. ......... 358/1.1; 347/129; 347/247; 347/255; 358/1.12; 358/406; 358/448; 399/9; 399/49

(58) Field of Classification Search .............. 358/1.1, 358/1.12, 406, 448; 399/9, 49; 347/129, 347/247, 255, 239, 240; 382/112
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,557,367 A | 9/1996 | Yang et al. | |
| 5,561,534 A * | 10/1996 | Ishida et al. | 358/448 |
| 5,568,246 A | 10/1996 | Keller et al. | |
| 5,570,172 A | 10/1996 | Acquaviva | |
| 5,596,416 A | 1/1997 | Barry et al. | |
| 5,629,762 A | 5/1997 | Mahoney et al. | |
| 5,704,023 A * | 12/1997 | Kim | 358/1.15 |
| 5,710,968 A | 1/1998 | Clark et al. | |
| 5,778,377 A | 7/1998 | Marlin et al. | |
| 5,884,910 A | 3/1999 | Mandel | |
| 5,894,802 A * | 4/1999 | Jackson | 101/485 |
| 5,966,231 A * | 10/1999 | Bush et al. | 359/204.1 |
| 5,995,721 A | 11/1999 | Rourke et al. | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — Chan S Park
*Assistant Examiner* — David S Cammack
(74) *Attorney, Agent, or Firm* — Fay Sharpe LLP (57) ABSTRACT

A defect once around signal time period of a defect source inherent in a marking device is determined, the defect source having one or more banding frequencies. A reference scanline time delay, which is a time between a page sync signal and a writing of a reference scanline, is determined. A test target is written, sensed and analyzed. A reference scanline phase offset of each banding frequency relative to the reference scanline is determined. A banding phase of each banding frequency is determined based at least on the defect once around signal time period, reference scanline time delay and reference scanline phase offset.

20 Claims, 5 Drawing Sheets

U.S. PATENT DOCUMENTS

| | | |
|---|---|---|
| 6,059,284 A | 5/2000 | Wolf et al. |
| 6,125,248 A | 9/2000 | Moser |
| 6,241,242 B1 | 6/2001 | Munro |
| 6,297,886 B1 | 10/2001 | Cornell |
| 6,341,773 B1 | 1/2002 | Aprato et al. |
| 6,384,918 B1 | 5/2002 | Hubble, III et al. |
| 6,450,711 B1 | 9/2002 | Conrow |
| 6,476,376 B1 | 11/2002 | Biegelsen et al. |
| 6,476,923 B1 | 11/2002 | Cornell |
| 6,493,098 B1 | 12/2002 | Cornell |
| 6,537,910 B1 | 3/2003 | Burke et al. |
| 6,550,762 B2 | 4/2003 | Stoll |
| 6,554,276 B2 | 4/2003 | Jackson et al. |
| 6,577,925 B1 | 6/2003 | Fromherz |
| 6,607,320 B2 | 8/2003 | Bobrow et al. |
| 6,608,988 B2 | 8/2003 | Conrow |
| 6,612,566 B2 | 9/2003 | Stoll |
| 6,612,571 B2 | 9/2003 | Rider |
| 6,621,576 B2 | 9/2003 | Tandon et al. |
| 6,633,382 B2 | 10/2003 | Hubble, III et al. |
| 6,639,669 B2 | 10/2003 | Hubble, III et al. |
| 6,819,906 B1 | 11/2004 | Herrmann et al. |
| 6,925,283 B1 | 8/2005 | Mandel et al. |
| 6,959,165 B2 | 10/2005 | Mandel et al. |
| 6,973,286 B2 | 12/2005 | Mandel et al. |
| 2002/0078012 A1 | 6/2002 | Ryan et al. |
| 2002/0103559 A1 | 8/2002 | Gartstein |
| 2002/0159791 A1 | 10/2002 | Chen et al. |
| 2003/0077095 A1 | 4/2003 | Conrow |
| 2003/0142985 A1* | 7/2003 | Sampath et al. ............ 399/9 |
| 2004/0041901 A1* | 3/2004 | Rahnavard et al. ......... 347/255 |
| 2004/0062582 A1* | 4/2004 | Dobbertin et al. ......... 399/394 |
| 2004/0085561 A1 | 5/2004 | Fromherz |
| 2004/0085562 A1 | 5/2004 | Fromherz |
| 2004/0088207 A1 | 5/2004 | Fromherz |
| 2004/0150156 A1 | 8/2004 | Fromherz et al. |
| 2004/0150158 A1 | 8/2004 | Biegelsen et al. |
| 2004/0153983 A1 | 8/2004 | McMillan |
| 2004/0216002 A1 | 10/2004 | Fromherz et al. |
| 2004/0225391 A1 | 11/2004 | Fromherz et al. |
| 2004/0225394 A1 | 11/2004 | Fromherz et al. |
| 2004/0247365 A1 | 12/2004 | Lofthus et al. |

OTHER PUBLICATIONS

Desmond Fretz, "Cluster Printing Solution Announced", Today at Xerox (TAX), No. 1129, Aug. 3, 2001.
U.S. Appl. No. 10/917,676, filed Aug. 13, 2004, Lofthus et al.
U.S. Appl. No. 10/999,326, filed Nov. 30, 2004, Grace et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/090,502, filed Mar. 25, 2005, Mongeon.
U.S. Appl. No. 11/095,378, filed Mar. 31, 2005, Moore et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/115,766, filed Apr. 27, 2005, Grace.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/170,873, filed Jun. 30, 2005, Klassen.
U.S. Appl. No. 11/170,975, filed Jun. 30, 2005, Klassen.
U.S. Appl. No. 11/189,371, filed Jul. 26, 2005, Moore et al.
U.S. Appl. No. 11/222,260, filed Sep. 8, 2005, Goodman et al.
U.S. Appl. No. 11/287,685, filed Nov. 28, 2005, Carolan.
U.S. Appl. No. 11/292,163, filed Nov. 30, 2005, Mandel et al.
U.S. Appl. No. 11/314,774, filed Dec. 21, 2005, Klassen.
U.S. Appl. No. 11/363,378, filed Feb. 27, 2006, Anderson et al.
U.S. Appl. No. 11/315,978, filed Dec. 21, 2005, Mizes et al.

* cited by examiner

SYSTEMS AND METHODS TO MEASURE BANDING PRINT DEFECTS

CROSS REFERENCE TO RELATED PATENTS AND APPLICATIONS

The following patents/applications, the disclosures of each being totally incorporated herein by reference are mentioned:

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.;

U.S. application Ser. No. 11/081,473, filed Mar. 16, 2005, entitled "PRINTING SYSTEM," by Steven R. Moore;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/090,502, filed Mar. 25, 2005, entitled "IMAGE QUALITY CONTROL METHOD AND APPARATUS FOR MULTIPLE MARKING ENGINE SYSTEMS," by Michael C. Mongeon;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/109,558, filed Apr. 19, 2005, entitled "SYSTEMS AND METHODS FOR REDUCING IMAGE REGISTRATION ERRORS," by Michael R. Furst, et al.;

U.S. application Ser. No. 11/109,996, filed Apr. 20, 2005, entitled "PRINTING SYSTEMS," by Michael C. Mongeon, et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/143,818, filed Jun. 2, 2005, entitled "INTER-SEPARATION DECORRELATOR," by Edul N. Dalal, et al.;

U.S. application Ser. No. 11/146,665, filed Jun. 7, 2005, entitled "LOW COST ADJUSTMENT METHOD FOR PRINTING SYSTEMS," by Michael C. Mongeon;

U.S. application Ser. No. 11/170,975, filed Jun. 30, 2005, entitled "METHOD AND SYSTEM FOR PROCESSING SCANNED PATCHES FOR USE IN IMAGING DEVICE CALIBRATION," by R. Victor Klassen;

U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER," by R. Victor Klassen;

U.S. application Ser. No. 11/189,371, filed Jul. 26, 2005, entitled "PRINTING SYSTEM," by Steven R. Moore, et al.;

U.S. application Ser. No. 11/222,260, filed Sep. 8, 2005, entitled "METHOD AND SYSTEMS FOR DETERMINING BANDING COMPENSATION PARAMETERS IN PRINTING SYSTEMS," by Goodman, et al.;

U.S. application Ser. No. 11/274,638, filed Nov. 15, 2005, entitled "GAMUT SELECTION IN MULTI-ENGINE SYSTEMS," by Wencheng Wu, et al.;

U.S. application Ser. No. 11/292,163, filed Nov. 30, 2005, entitled "RADIAL MERGE MODULE FOR PRINTING SYSTEM," by Barry P. Mandel, et al.; and U.S. application Ser. No. 11/314,774, filed Dec. 21, 2005, entitled "METHOD AND APPARATUS FOR MULTIPLE PRINTER CALIBRATION USING COMPROMISE AIM," by R. Victor Klassen;

U.S. application Ser. No. 11/315,978, filed Dec. 21, 2005, entitled "COMPENSATION OF MPA POLYGON ONCE AROUND WITH EXPOSURE MODULATION," by Howard A. Mizes et al.; and U.S. application Ser. No. 11/363,378, filed Feb. 27, 2006, entitled "SYSTEM FOR MASKING PRINT DEFECTS," by David G. Anderson et al.

BACKGROUND

The present exemplary embodiment relates to document processing systems. It finds particular application in conjunction with sensing and control of banding and will be described with a particular reference thereto. However, it is to be appreciated that the present exemplary embodiment is also amenable to other like applications.

In a typical printing system, a photoconductive drum or photoreceptor rotates at an angular velocity. As the photoconductive drum rotates, the photoconductive drum is electrostatically charged. A latent image is exposed line by line onto the photoconductive drum using a scanning laser, e.g., using a rotating polygon mirror. The latent image is developed by electrostatically adhering toner particles to the photoconductive drum. The developed image is transferred from the photoconductive drum to the output media such as paper. The toner image on the paper is fused to the paper to make the image on the paper permanent. The surface of the photoconductive drum is cleaned to remove any residual toner on the surface of the photoconductive drum.

Typically, the printing device drives the photoconductive drum using a motor drive system or a motor train. The motor drive system, which drives the photoconductive drum, has a substantial amount of external loading, because the motor drive system typically drives the auxiliary rollers and transports the paper through a series of gear trains. With the additional external loading, as well as periodic disturbances due to imperfections in the series of gear trains, the motor drive system imparts a varying velocity on the photoconductive drum.

The varying photoconductive drum velocity causes scan line spacing variation in the printed image. The scan line spacing variation is a significant contributor of artifacts in marking process. For example, halftone banding caused by scan line spacing variation is one of the most visible and undesirable artifacts, appearing as light and dark streaks across a printed page perpendicular to the process direction. Banding generally occurs across the full width of an image, and may vary in amplitude in time and in the direction perpendicular to the marking process direction, i.e., the cross-process direction. Often the dominant banding defect source (or sources) are well known ahead of time based on mechanical design of the printing system. For example, the banding can occur due to a motion quality error due to runout of a roll, gear teeth meshing errors, ROS polygon once around errors, and the like.

However, the periodic bands are generally not synchronous with the image. Thus, while each image may have the same banding frequency and amplitude, the banding phase relative to the image differs from one print to another.

One approach to eliminate banding defects is to require the manufacture of parts/subsystems to meet tight tolerances which results in high costs.

Another approach is to measure velocity at various points in a mechanical drive train or at the photoreceptor drum and compensate for the velocity variation.

There is a need for methods and apparatuses that overcome the aforementioned problems and others.

REFERENCES

U.S. Published Application No. 2002/0159791, published Oct. 31, 2002, entitled SYSTEMS AND METHODS FOR REDUCING BANDING ARTIFACT IN ELECTROPHOTOGRAPHIC DEVICES USING DRUM VELOCITY CONTROL, by Chen, discusses an electrophotographic device which uses a closed loop controller that receives a feedback signal from an encoder connected to the OPC drum to improve the rotational velocity control of the drum.

However, the reference does not discuss measuring the image and using this information to improve or alleviate banding defect of the marking device.

BRIEF DESCRIPTION

In accordance with one aspect, a method is disclosed. A defect once around signal time period of a defect source inherent in a marking device is determined, the defect source having one or more banding frequencies. A reference scanline time delay which is a time between a page sync signal and a writing of a reference scanline, is determined. A test target is written. The test target is sensed and analyzed. A reference scanline phase offset of each banding frequency relative to the reference scanline is determined. A banding phase of each banding frequency is determined based at least on the defect once around signal time period, reference scanline time delay and reference scanline phase offset.

In accordance with another aspect, a system is disclosed. A defect once around determining device determines a defect once around signal time period of a defect source inherent in a marking device. A reference scanline time delay determining device determines a time period between a page sync signal of the marking device and a writing of the reference scanline. An image sensing device senses a test target. Based on the sensed test target, a reference scanline phase offset determining device determines a phase of each banding frequency relative to the reference scanline. A banding phase determining device determines a banding phase of each banding frequency relative to the defect once around signal based at least on the defect once around signal time period, reference scanline time delay and reference scanline phase offset.

In accordance with another aspect, a method is disclosed. A defect once around signal time period of a defect source inherent in a marking device is determined. A reference scanline time delay, which is a time between a page sync signal and writing a reference scanline, is determined. A test target is written. While writing the test target, a defect once around offset time, which is a time between the page sync signal and defect once around signal, is determined. The test target is sensed and analyzed. A phase of each banding frequency relative to the reference scanline is determined. A phase of each banding frequency is determined based at least on the defect once around signal time period, reference scanline time delay, the defect once around offset time, and phase relative to the reference scanline.

DETAILED DESCRIPTION

Figure 1:
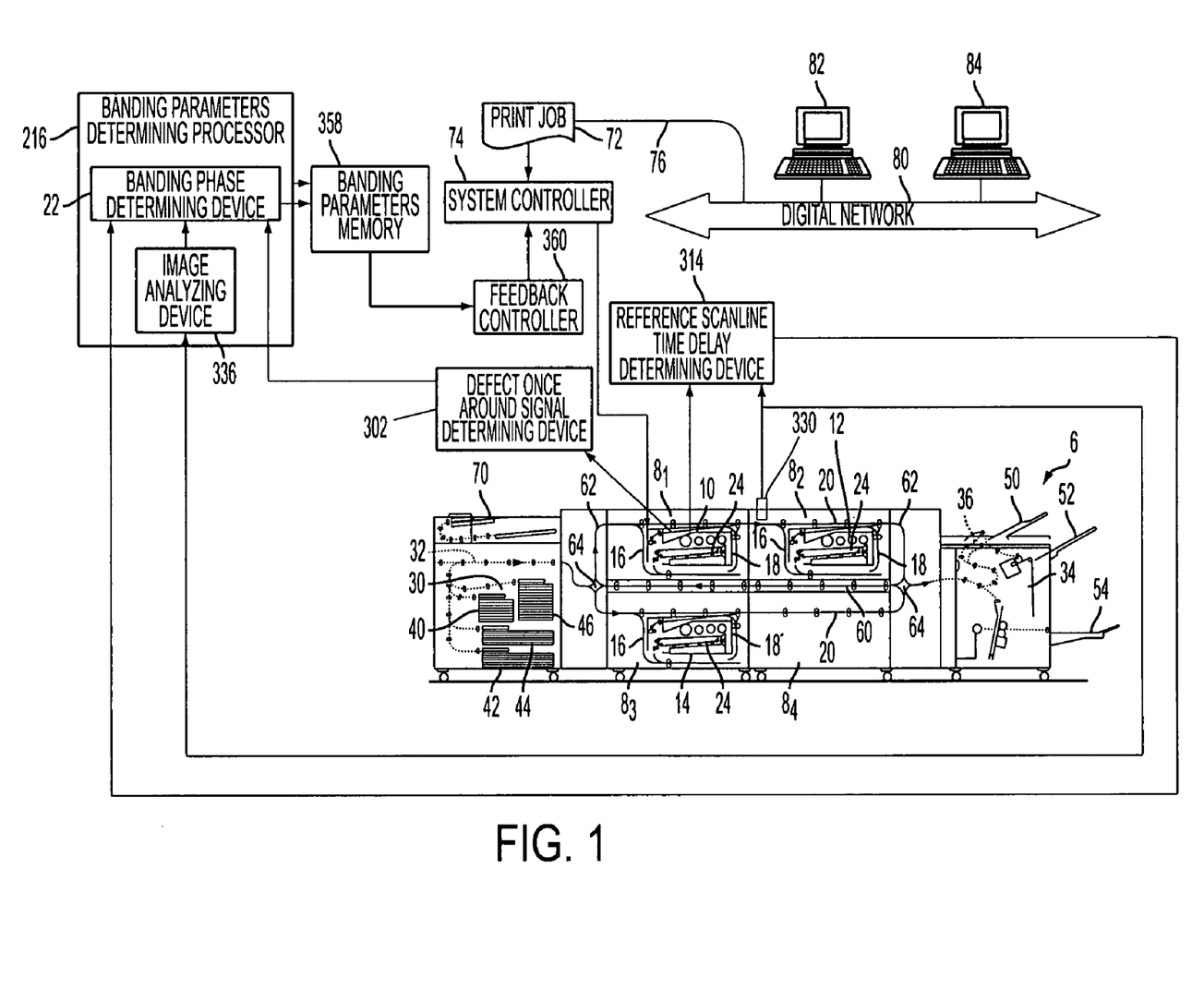
FIG. 1 is a diagrammatic illustration of a document processing system.

With reference to FIG. 1, an example printing or document processing system 6 includes first, second, . . . , nth marking engine processing units $8_1, 8_2, 8_3, \ldots, 8_n$ each including an associated first, second, . . . , nth marking or print engines or devices 10, 12, 14 and associated entry and exit inverter/bypasses 16, 18. In some embodiments, marking engines are removable. For example, in FIG. 1, an integrated marking engine and entry and exit inverter/bypasses of the processing unit $8_4$ are shown as removed, leaving only a forward or upper paper path 20. In this manner, for example, the functional marking engine portion can be removed for repair, or can be replaced to effectuate an upgrade or modification of the printing system 6. While three marking engines 10, 12, 14 are illustrated (with the fourth marking engine being removed), the number of marking engines can be one, two, three, four, five, or more. Providing at least two marking engines typically provides enhanced features and capabilities for the printing system 6 since marking tasks can be distributed amongst the at least two marking engines. Some or all of the marking engines 10, 12, 14 may be identical to provide redundancy or improved productivity through parallel printing. Alternatively or additionally, some or all of the marking engines 10, 12, 14 may be different to provide different capabilities. For example, the marking engines 12, 14 may be color marking engines, while the marking engine 10 may be a black (K) marking engine.

As discussed in detail below, a banding phase determining mechanism, device, algorithm or processor 22 determines a banding phase of a fundamental frequency and harmonically related frequencies as relative to the image printed by one of the marking engines 10, 12, 14 and to the banding defect inherent in an associated marking engine.

With continuing reference to FIG. 1, the illustrated marking engines 10, 12, 14 employ xerographic printing technology, in which as a photoreceptor 24 rotates, driven by a motor train, an electrostatic charge is developed. A latent image is exposed line by line onto the photoreceptor using, for example, a scanning laser. The electrostatic image is formed, coated with a toner material, and then transferred and fused to paper or another print medium by application of heat and pressure. However, marking engines employing other printing technologies can be provided, such as marking engines employing ink jet transfer, thermal impact printing, or so forth. The processing units of the printing system 6 can also be other than marking engines; such as, for example, a print media feeding source or feeder 30 which includes associated print media conveying components 32. The media feeding source 30 supplies paper or other print media for printing. Another example of the processing unit is a finisher 34 which includes associated print media conveying components 36. The finisher 34 provides finishing capabilities such as collation, stapling, folding, stacking, hole-punching, binding, postage stamping, and so forth.

The print media feeding source 30 includes print media sources or input trays 40, 42, 44, 46 connected with the print media conveying components 32 to provide selected types of print media. While four print media sources are illustrated, the number of print media sources can be one, two, three, four, five, or more. Moreover, while the illustrated print media sources 40, 42, 44, 46 are embodied as components of the dedicated print media feeding source 30, in other embodiments one or more of the marking engine processing units may include its own dedicated print media source instead of or in addition to those of the print media feeding source 30. Each of the print media sources 40, 42, 44, 46 can store sheets of the same type of print media, or can store different types of print media. For example, the print media sources 42, 44 may store the same type of large-size paper sheets, print media source 40 may store company letterhead paper, and the print media source 46 may store letter-size paper. The print media can be substantially any type of media upon which one or more of the marking engines 10, 12, 14 can print, such as high quality bond paper, lower quality "copy" paper, overhead transparency sheets, high gloss paper, and so forth.

Since multiple jobs arrive at the finisher 34 during a common time interval, the finisher 34 includes two or more print media finishing destinations or stackers 50, 52, 54 for collecting sequential pages of each print job that is being contemporaneously printed by the printing system 6. Generally, the number of the print jobs that the printing system 6 can contemporaneously process is limited to the number of available stackers. While three finishing destinations are illustrated, the printing system 6 may include two, three, four, or more print media finishing destinations. The finisher 34 deposits each sheet after processing in one of the print media finishing destinations 50, 52, 54, which may be trays, pans, stackers and so forth. While only one finishing processing unit is illustrated, it is contemplated that two, three, four or more finishing processing units can be employed in the printing system 6.

Bypass routes in each marking engine processing unit, such as the forward paper path 20 and a reverse paper path 60, provide a means by which the sheets can pass through the corresponding marking engine processing unit without interacting with the marking engine. Branch paths 62, 64 are also provided to take the sheet into the associated marking engine and to deliver the sheet back to the upper or forward paper path 20 of the associated marking engine processing unit.

The printing system 6 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. In general, some sheets may have mixed color and black-and-white printing. Execution of the print job may also involve collating the sheets in a certain order. Still further, the print job may include folding, stapling, punching holes into, or otherwise physically manipulating or binding the sheets.

Print jobs can be supplied to the printing system 6 in various ways. A built-in optical scanner 70 can be used to scan a document such as book pages, a stack of printed pages, or so forth, to create a digital image of the scanned document that is reproduced by printing operations performed by the printing system 6. Alternatively, one or more print jobs 72 can be electronically delivered to a system controller 74 of the printing system 6 via a wired connection 76 from a digital network 80 that interconnects example computers 82, 84 or other digital devices. For example, a network user operating word processing software running on the computer 84 may select to print the word processing document on the printing system 6, thus generating the print job 72, or an external scanner (not shown) connected to the network 80 may provide the print job in electronic form. While a wired network connection 76 is illustrated, a wireless network connection or other wireless communication pathway may be used instead or additionally to connect the printing system 6 with the digital network 80. The digital network 80 can be a local area network such as a wired Ethernet, a wireless local area network (WLAN), the Internet, some combination thereof, or so forth. Moreover, it is contemplated to deliver print jobs to the printing system 6 in other ways, such as by using an optical disk reader (not illustrated) built into the printing system 6, or using a dedicated computer connected only to the printing system 6.

The printing system 6 is an illustrative example. In general, any number of print media sources, media handlers, marking engines, collators, finishers or other processing units can be connected together by a suitable print media conveyor configuration. While the printing system 6 illustrates a 2×2 configuration of four marking engines, buttressed by the print media feeding source on one end and by the finisher on the other end, other physical layouts can be used, such as an entirely horizontal arrangement, stacking of processing units three or more units high, or so forth. Moreover, while in the printing system 6 the processing units have removable functional portions, in some other embodiments some or all processing units may have non-removable functional portions. It is contemplated that even if the marking engine portion of the marking engine processing unit is non-removable, associated upper or forward paper paths 20 through each marking engine processing unit enables the marking engines to be taken "off-line" for repair or modification while the remaining processing units of the printing system continue to function as usual.

In some embodiments, separate bypasses for intermediate components may be omitted. The "bypass path" of the conveyor in such configurations suitably passes through the functional portion of a processing unit, and optional bypassing of the processing unit is effectuated by conveying the sheet through the functional portion without performing any processing operations. Still further, in some embodiments the printing system may be a stand alone printer or a cluster of networked or otherwise logically interconnected printers, with each printer having its own associated print media source and finishing components including a plurality of final media destinations.

Although several media path elements are illustrated, other path elements are contemplated which might include, for example, inverters, reverters, interposers, and the like, as known in the art to direct the print media between the feeders, printing or marking engines and/or finishers.

The controller 74 controls the production of printed sheets, the transportation over the media path, and the collation and assembly as job output by the finisher 34.

Figure 2:
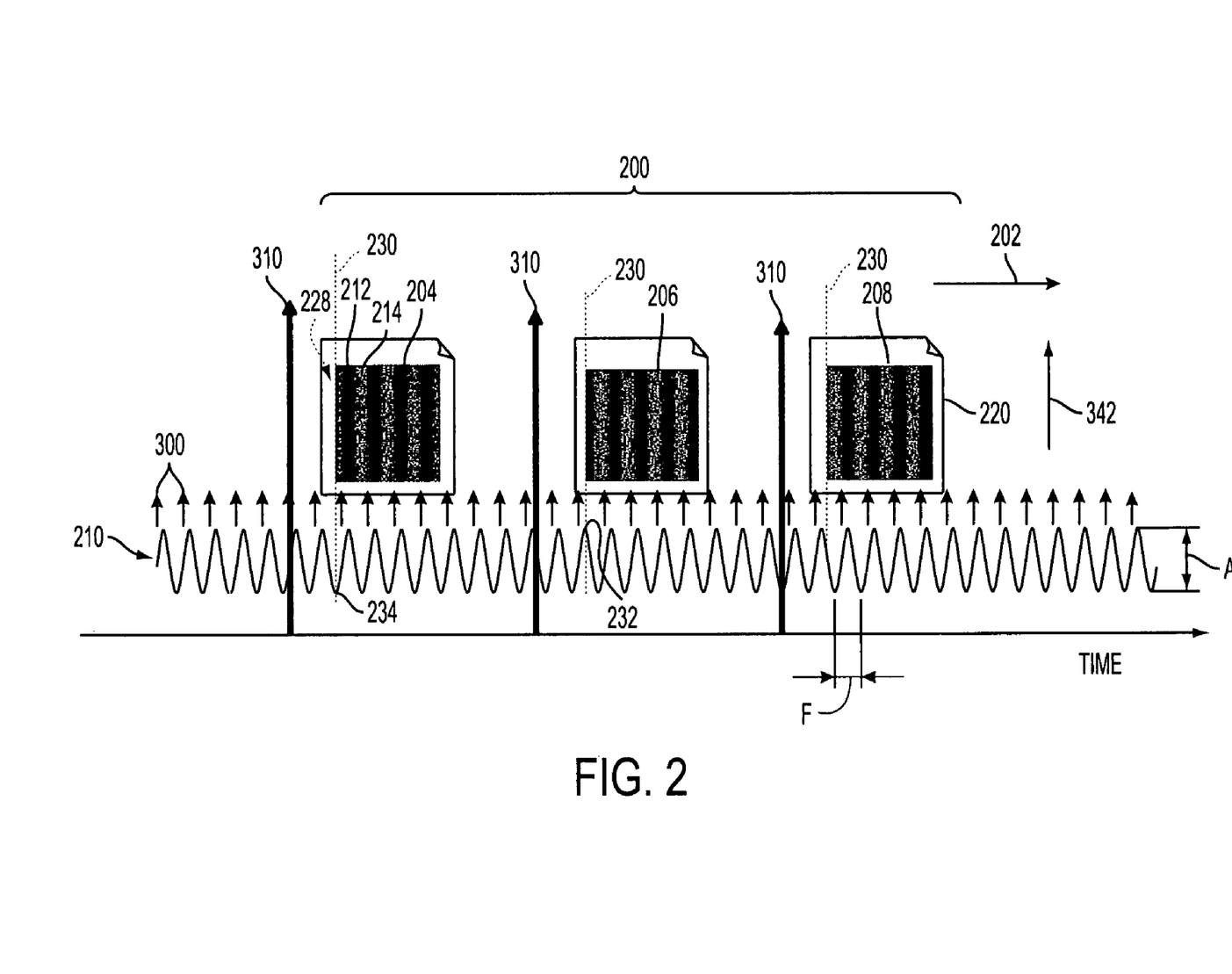
FIG. 2 is a diagrammatic illustration of banding print defects over time.

With continuing reference to FIG. 1 and further reference to FIG. 2, a series 200 of images is processed in a process direction 202, e.g. the direction of paper travel in the printing system 6. For example, the images such as first, second and third print or test targets 204, 206, 208 are printed on sheets 220 of paper. Nominally, with no banding error, the images are uniform midtone (approximately 50% area coverage)

single separation target. Due to a banding defect source within the printer, however, the test targets 204, 206, 208 are not uniform in density. As seen in FIG. 2, the test targets 204, 206, 208 each includes a periodic density variation, which is demonstrated by a banding defect graph 210 and results in alternating dark and light strips or bands 212, 214 in the process direction 202. For example, the banding defect graph 210 might represent a variation in velocity or velocity error of the photoreceptor 24. A banding parameters determining processor, algorithm or mechanism 216 determines frequency F and amplitude A of the banding defect which are about the same for each test target 204, 206, 208 and are measured as known in the art. For example, the density of the test target as a function of position in the process direction 202 is sensed on the print, photoreceptor, or intermediate belt. Fourier analysis or other signal processing algorithms or techniques are used to generate profiles, extract the amplitude, and the like. Other examples are described, for example, in the patent application Ser. No. 11/222,260, entitled "Methods and Systems for Determining Banding Compensation Parameters in Printing Systems," by Goodman et al., identified above. In one embodiment, the banding frequency is known a priori. However, a phase $\phi_D$ of the banding defect is different for each test target 204, 206, 208 relative to a trailing edge 228 of each test target 204, 206, 208 which trailing edge 228 defines a reference point or scanline 230 of each image. For example, for the second test target 206, a defect peak 232 of the defect graph 210 coincides with the trailing edge 230 of the second test target 206. For the third test target 208, a defect near-peak of the defect graph 210 coincides with the trailing edge 230 of the third test target 208. For the first test target 204, a defect trough 234 of the defect graph 210 coincides with the trailing edge 230 of the first test target 204.

Figure 3:
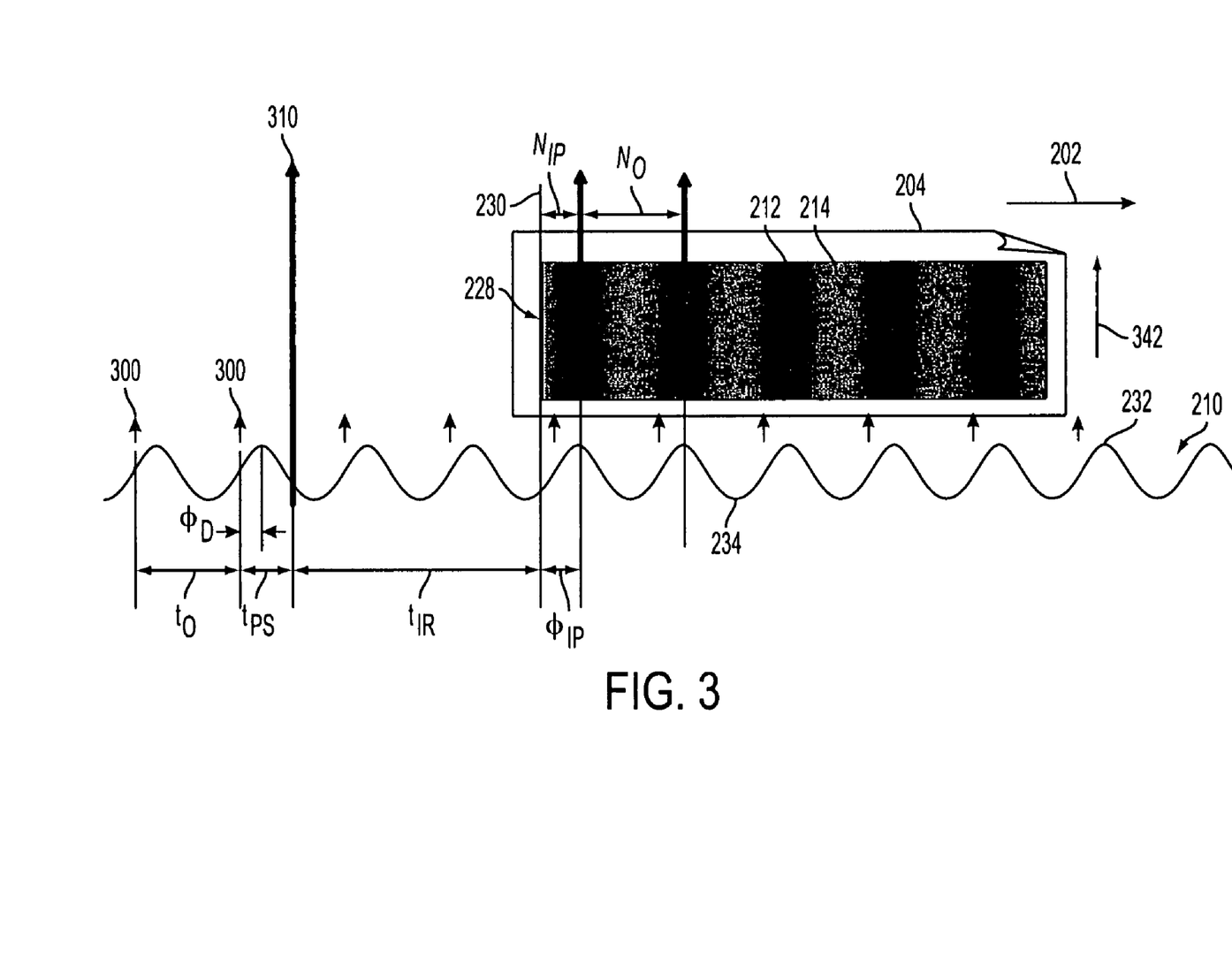
FIG. 3 is a diagrammatic illustration of a detail of banding print defects on the single image.
Figure 4:
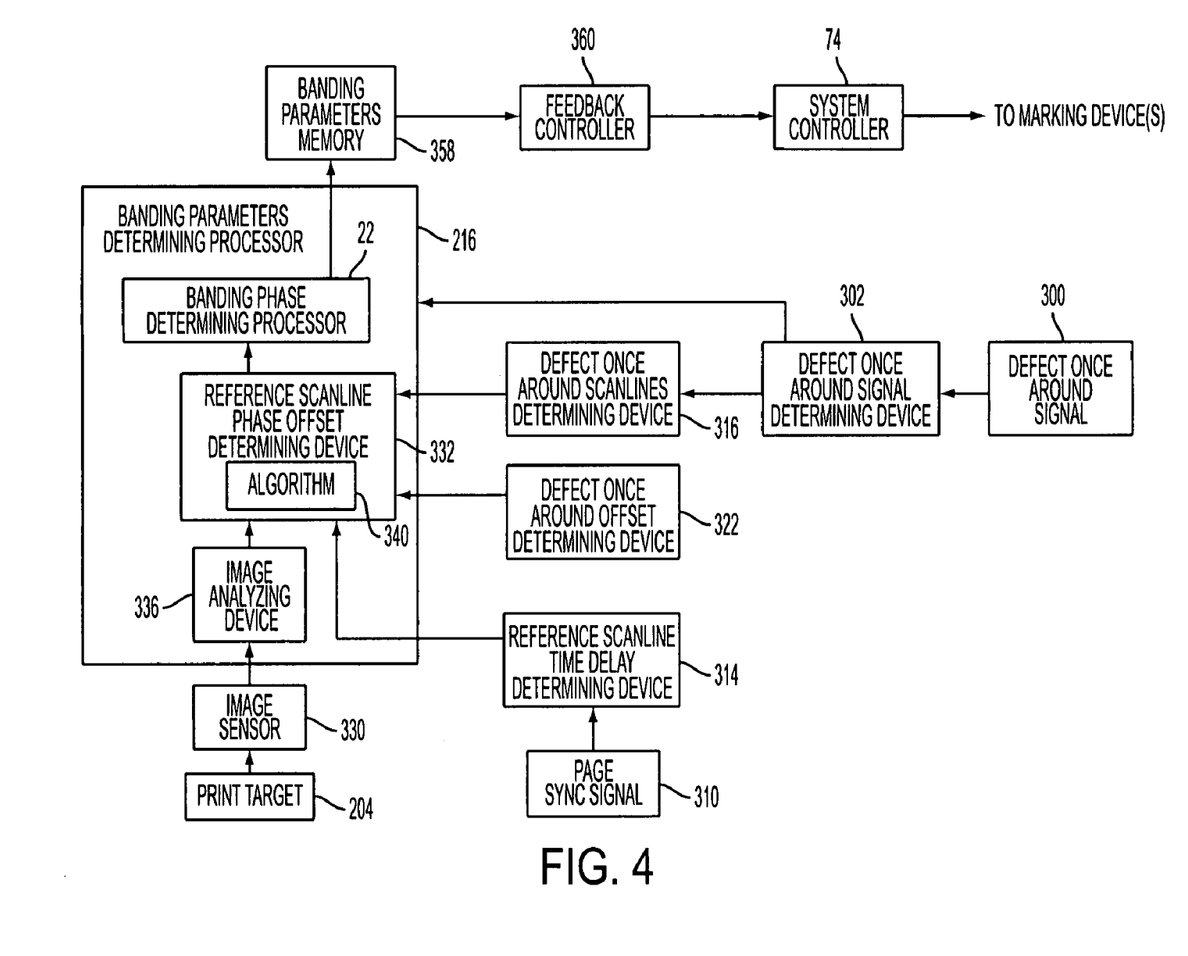
FIG. 4 is a diagrammatic illustration of a detailed portion of a document processing system.
Figure 5:
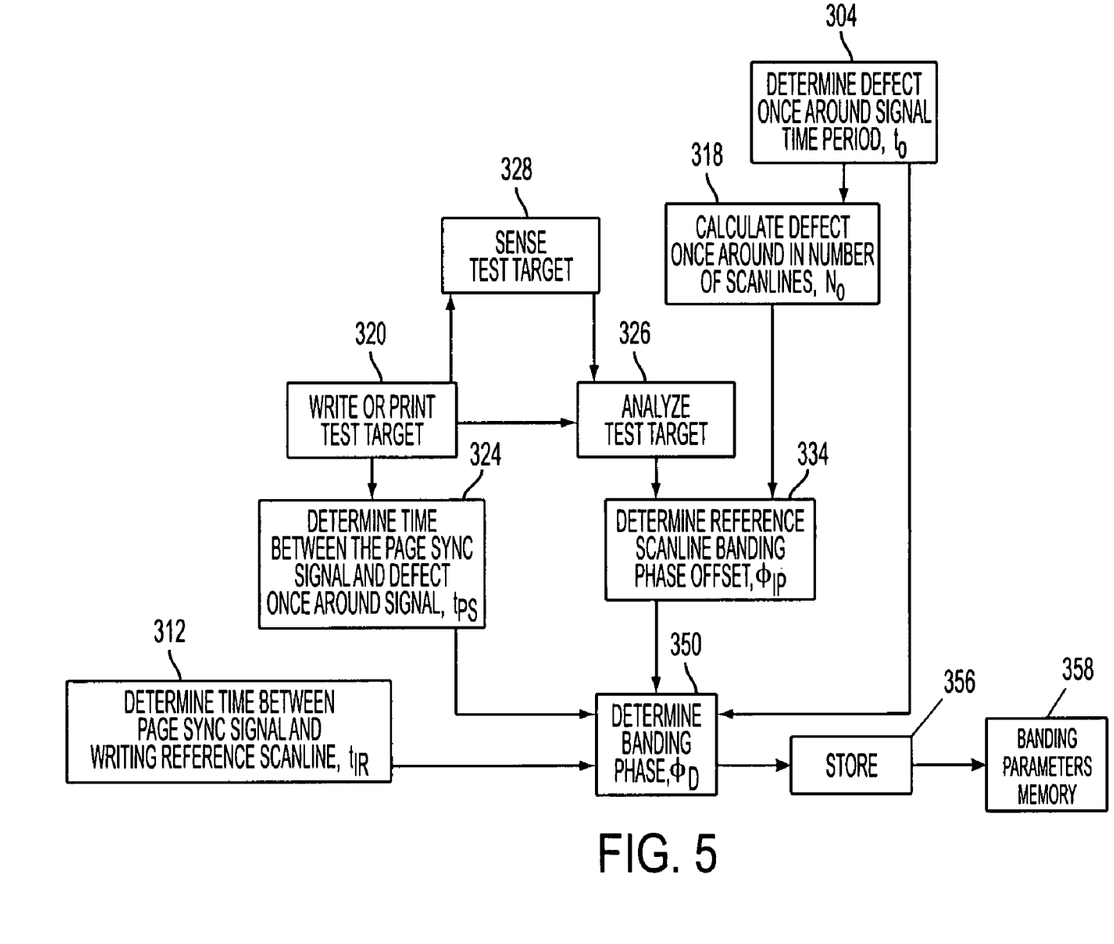
FIG. 5 is a block diagram of a control methodology approach.

With continuing reference to FIG. 2 and further reference to FIGS. 3, 4 and 5, a defect once around period, $t_0$, is determined in advance. For example, a defect once around signal 300, such as an electronic signal associated with a priori known defect source or banding frequency, detects the defect and sends the defect once around signal 300 indicative of the defect presence in the cycle. The example of the defect source is a mechanical linkage such as a gear or a roll. A phase difference between the defect once around signal 300 and the defect peak 232 of the banding defect graph 210 is a phase $\phi_D$ of the banding defect relative to the defect once around signal 300.

A defect once around signal determining device, processor or algorithm 302 determines 304 the time period $t_0$ of the defect once around signal. A reference scanline delay time $t_{IR}$ between a page sync signal 310 and actual writing of the reference scanline 230 is determined 312. The page sync signal 310 is used by the printing system 6 as a trigger for the printing device to initiate printing of each image. For example, the page sync signal 310 is the electronic trigger signal which initiates printing of the image after a preset start up delay timer expires, e.g. with a time delay. The timing between the page sync signal 310 and printing of the reference scanline 230 is fixed and highly repeatable. In one embodiment, a start up test target is printed in advance. A reference scanline delay determining device, sensor or algorithm 314 determines 312 the reference scanline delay time $t_{IR}$ between the page sync signal 310 and the printing of the reference scanline 230 based on the start up test target. Of course, it is contemplated that defect once around time period $t_0$ and reference scanline delay time $t_{IR}$ between the page sync signal 310 and printing of the reference scanline 230 could be a priori known in advance.

A defect once around scanlines determining device, algorithm or mechanism 316 calculates 318 the defect once around in terms of a number of scanlines $N_O$:

$$N_O = t_O \cdot V_P \cdot y_{DPI} \tag{1}$$

where $N_O$ is the defect once around period in number of scanlines,
$t_O$ is the defect once around time period,
$V_P$ is a known process speed, and
$y_{DPI}$ is a known scanner resolution.

A print test target 204 is printed 320. The print test target 204 is, for example, a uniform 50% area coverage patch whose length extends the whole process length of the image. More complex test targets are contemplated. While the print test target 204 is being printed 320, a defect once around offset determining device, sensor or mechanism 322 determines 324 a time $t_{PS}$ between the page sync signal 310 and the defect once around signal 300. The print test target 204 is scanned with an offline scanner and analyzed 326. In one embodiment, the print test target 204 is sensed 328 by an online measurement device such as a sensor or sensing device 330. Of course, it is contemplated that the test target can be sensed and/or measured on the photoreceptor or intermediate belt. The examples of the sensing or measurement devices are full width array sensor, inline full width array sensor and single point sensor.

From the analyzed print test target, a reference scanline phase offset determining device, mechanism or algorithm 332 determines 334 a reference scanline banding phase offset $\phi_{IP}$, e.g. the banding phase relative to the reference scanline 230. In one embodiment, an image analyzing device or algorithm 336 determines the number of scanlines $N_{IP}$ between the peak 232 of the defect graph 210 and the reference scanline 230. The phase $\phi_{IP}$ of the banding defect relative to the reference scanline is:

$$\phi_{IP} = 2\pi \cdot \frac{N_{IP}}{N_O}, \tag{2}$$

where $\phi_{IP}$ is the phase of the banding defect relative to the reference scanline,
$N_O$ is the defect once around period number of scanlines, and
$N_{IP}$ is the number of scanlines between the peak of the defect graph and the reference scanline.

In another embodiment, the reference scanline phase offset determining device 332 determines 334 the phase $\phi_{IP}$ of the banding defect relative to the reference scanline 230 by a use of a filtering algorithm or technique 340 such as, for example, a matched filter algorithm which provides more accurate and repeatable results, especially for low amplitude banding:

$$\phi_{IP} = \arctan\left(\frac{-\sum_{n=0}^{N-1} p(n) \cdot \sin\left(\frac{2\pi n}{N_O}\right)}{\sum_{n=0}^{N-1} p(n) \cdot \cos\left(\frac{2\pi n}{N_O}\right)}\right), \tag{3}$$

where $\phi_{IP}$ is the phase of the banding defect relative to the reference scanline,
$N_O$ is the defect once around period number of scanlines,
p(n) is the profile of the scanned test target in the process direction, and
n is the scanline number from the reference scanline.

The profile p(n) can be calculated by taking the average of the scanned test target 204 in a cross-process direction 342, yielding a profile along the process direction 202.

In yet another embodiment, phases $\phi_{IPH}$ of the banding defect relative to the reference scanline of harmonically related frequencies are calculated:

$$\phi_{IPH} = \arctan\left(\frac{-\sum_{n=0}^{N-1} p(n)\cdot\sin\left(\frac{2\pi n}{kN_O}\right)}{\sum_{n=0}^{N-1} p(n)\cdot\cos\left(\frac{2\pi n}{kN_O}\right)}\right), \quad (4)$$

where k is equal to 1 for a fundamental frequency F.

In one embodiment, equations (3) and (4) are modified to include a windowing function on the profile p(n) as known in the art.

The banding phase determining device 22 determines 350 the banding phase $\phi_D$ relative to the defect once around signal 300:

$$\phi_D = 2\pi\cdot\left(\frac{t_{PS}+t_{IR}}{t_O}-m\right)+\phi_{IPH}, \quad (5)$$

where m is an integer which is selected so that the banding frequency $\phi_D$ is greater than or equal to 0 and less than $2\pi$, $t_O$ is the defect once around time period, $t_{IR}$ is the time between the page sync signal and reference scanline, $t_{PS}$ is the time between the defect once around signal and page sync signal, $\phi_{IPH}$ is the banding phase of harmonically related frequencies relative to the reference scanline, and $\phi_D$ is the banding phase of harmonically related frequencies relative to the defect once around signal.

Determined banding parameters are stored 356 in a banding parameters memory 358.

Although described with reference to one marking engine, the above is applicable to each or selected marking engines of the printing system 6. Based at least on one of the banding phase, frequency and amplitude of banding, a feedback controller 360 utilizes methods and algorithms known in the art to determine banding compensation parameters and compensate for banding, as for example, controlling the laser intensity in the laser printing system. E.g., a corrective amplitude and phase are determined to introduce a corrective print pattern which, when printed, interferes with banding and minimizes banding effect on the output image.

It will be appreciated that variants of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
    determining a defect once around signal time period of a defect source inherent in a marking device, the defect source having one or more banding frequencies;
    determining a reference scanline time delay which is a time between a page sync signal and a writing of a reference scanline;
    writing a test target;
    sensing the test target;
    analyzing the sensed test target;
    based on the analysis, determining a reference scanline phase offset of each banding frequency relative to the reference scanline; and
    determining a banding phase of each banding frequency based at least on the defect once around signal time period, the reference scanline time delay and the reference scanline phase offset.

2. The method as set forth in claim 1, wherein the step of determining the reference scanline phase offset includes:
    based on the determined defect once around signal time period, determining a defect once around number of scanlines, and further including:
    determining a defect peak on the sensed test target;
    determining a number of scanlines between the defect peak and reference scanline; and
    based on the defect once around number of scanlines and number of scanlines between the defect peak and reference scanline, determining the phase of each banding frequency relative to the reference scanline.

3. The method as set forth in claim 2, wherein the phase of banding frequency relative to the reference scanline is determined as:

$$\phi_{IP} = 2\pi\cdot\frac{N_{IP}}{N_O},$$

where $\phi_{IP}$ is the phase of a banding frequency relative to the reference scanline, $N_O$ is the defect once around number of scanlines, and $N_{IP}$ is the number of scanlines between the defect peak and reference scanline.

4. The method as set forth in claim 1, wherein the step of determining the reference scanline phase offset includes:
    based on the determined defect once around signal time period, determining a defect once around number of scanlines, and further including:
    determining a profile of the sensed test target in a process direction; and
    determining the banding phase of each banding frequency relative to the reference scanline based on the determined profile.

5. The method as set forth in claim 4, wherein the phase of banding frequency relative to the reference scanline is determined as:

$$\phi_{IP} = \arctan\left(\frac{-\sum_{n=0}^{N-1} p(n)\cdot\sin\left(\frac{2\pi n}{kN_O}\right)}{\sum_{n=0}^{N-1} p(n)\cdot\cos\left(\frac{2\pi n}{kN_O}\right)}\right),$$

where $\phi_{IP}$ is the phase of each banding frequency relative to the reference scanline, $N_O$ is the defect once around period number of scanlines, p(n) is the profile of the test target in the process direction, n is a scanline number count from the reference scanline, and k represents harmonically related frequencies.

6. The method as set forth in claim 1, wherein the step of determining the banding phase includes:
   determining a defect once around offset time which is a time between the page sync signal and defect once around signal; and
   based at least on the determined reference scanline phase offset, defect once around signal time period, reference scanline time delay, and defect once around offset time, determining the phase of each banding frequency.

7. The method as set forth in claim 6, wherein the banding phase is determined as:

$$\phi_{D_{(k)}} = 2\pi \cdot \left(\frac{t_{PS} + t_{IR}}{t_O} - m\right) + \phi_{IP_{(k)}}$$

where m is an integer,
$\phi_{D_{(k)}}$ is the banding phase,
$\phi_{IP_{(k)}}$ is the phase of each respective banding frequency k relative to the reference scanline,
$t_O$ is the defect once around signal time period,
$t_{IR}$ is the reference scanline time delay or the time between the page sync signal and reference scanline, and
$t_{PS}$ is the defect once around offset time or the time between the page sync signal and defect once around signal.

8. The method as set forth in claim 7, further including:
   selecting the integer m so that the banding phase is greater than or equal to 0 and less than $2\pi$.

9. The method as set forth in claim 1, further including:
   determining values of amplitude corresponding to each banding frequency;
   determining at least one banding compensation parameter based at least on one of the frequency, amplitude and phase of banding; and
   adjusting characteristics of producing an image based on the determined banding compensation parameter to compensate the banding inherent in the marking device.

10. The method of claim 1, wherein the marking device is a xerographic imaging device.

11. A system comprising:
   a defect once around signal determining device which determines a defect once around signal time period of a defect source inherent in a marking device;
   a reference scanline time delay determining device which determines a time period between a page sync signal of the marking device and a writing of the reference scanline;
   an image sensing device which senses a test target;
   a reference scanline phase offset determining device, which, based on an analysis of the sensed test target, determines a phase of each banding frequency relative to the reference scanline; and
   a banding phase determining device which determines a banding phase of each banding frequency relative to the defect once around signal based at least on the defect once around signal time period, the reference scanline time delay and the reference scanline phase offset.

12. The system as set forth in claim 11, further including:
   a defect once around scanline number determining device which, based on the determined defect once around signal time period, determines a defect once around number of scanlines.

13. The system as set forth in claim 12, further including:
   an image analyzing device which determines a defect peak on the sensed test target and calculates a number of scanlines between the defect peak and reference scanline, and wherein reference scanline phase offset determining device determines the phase of banding defect relative to the reference scanline as a ratio of the number of scanlines between the defect peak and reference scanline to the defect once around number of scanlines.

14. The system as set forth in claim 12, further including:
   an image analyzing device which determines a profile of the sensed test target in a process direction; and
   a banding frequency phase determining device which determines the phase of each banding frequency relative to the reference scanline based on the determined profile.

15. The system as set forth in claim 14, wherein the algorithm is:

$$\phi_{IP} = \arctan\left(\frac{-\sum_{n=0}^{N-1} p(n) \cdot \sin\left(\frac{2\pi n}{kN_o}\right)}{\sum_{n=0}^{N-1} p(n) \cdot \cos\left(\frac{2\pi n}{kN_o}\right)}\right),$$

where $\phi_{IP}$ is the phase of each banding frequency relative to the reference scanline,
$N_0$ is the defect once around period number of scanlines,
p(n) is the profile of the test target in the process direction,
n is a scanline number count from the reference scanline, and
k represents harmonically related frequencies.

16. The system as set forth in claim 11, further including:
   a defect once around offset determining device which determines a defect once around offset time between the page sync signal and defect once around signal, and wherein the banding phase determining device determines the phase of each banding frequency relative to the defect once around signal based at least on the determined reference scanline phase offset, defect once around signal time period, reference scanline time delay, and defect once around offset time as:

$$\phi_{D_{(k)}} = 2\pi \cdot \left(\frac{t_{PS} + t_{IR}}{t_O} - m\right) + \phi_{IP_{(k)}}$$

where m is an integer so that a frequency of banding is greater than or equal to 0 and less than $2\pi$,
$\phi_{D_{(k)}}$ is the phase of banding frequency relative to the defect once around signal,
$\phi_{D_{(k)}}$ is the phase of each respective banding frequency k relative to the reference scanline,
$t_O$ is the defect once around signal time period,
$t_{IR}$ is the reference scanline time delay or the time between the page sync signal and printing of the reference scanline, and
$t_{PS}$ is the defect once around offset time or the time between the page sync signal and defect once around signal.

17. The system as set forth in claim 11, further including:
   a feedback processor which, based at least on the determined banding phase, determines at least one banding compensation parameter, and adjusts characteristics of producing an image based on the determined banding compensation parameter to compensate the banding inherent in the marking device.

18. The system of claim 11, wherein the marking device is a xerographic imaging device.

19. The system as set forth in claim 13, wherein the phase of banding frequency relative to the reference scanline is determined as:

$$\phi_{IP} = 2\pi \cdot \frac{N_{IP}}{N_O},$$

where φhd IP is the phase of a banding frequency relative to the reference scanline, $N_O$ is the defect once around number of scanlines, and $N_{IP}$ is the number of scanlines between the defect peak and reference scanline.

20. A method comprising:
   determining a defect once around signal time period of a defect source inherent in a marking device;
   determining a reference scanline time delay which is a time between a page sync signal and a writing of a reference scanline;
   writing a test target;
   while writing the test target, determining a defect once around offset time which is a time between the page sync signal and a defect once around signal;
   sensing the test target;
   analyzing the sensed test target;
   based on the analysis, determining a phase of each banding frequency relative to the reference scanline; and
   determining a phase of each banding frequency based at least on the defect once around signal time period, the reference scanline time delay, the defect once around offset time, and the phase of each respective banding frequency relative to the reference scanline.

* * * * *